(12) United States Patent
Shimizu et al.

(10) Patent No.: US 8,023,779 B2
(45) Date of Patent: Sep. 20, 2011

(54) OPTICAL TOUCH PANEL

(75) Inventors: Yusuke Shimizu, Ibaraki (JP); Sakura Toshikawa, Ibaraki (JP)

(73) Assignee: Nitto Denko Corporation, Ibaraki-shi, Osaka (JP)

( * ) Notice: Subject to any disclaimer, the term of this patent is extended or adjusted under 35 U.S.C. 154(b) by 127 days.

(21) Appl. No.: 12/536,033

(22) Filed: Aug. 5, 2009

(65) Prior Publication Data

US 2010/0033445 A1 Feb. 11, 2010

(30) Foreign Application Priority Data

Aug. 6, 2008 (JP) ................................ 2008-202660

(51) Int. Cl.
*G06F 3/041* (2006.01)
*G02B 6/10* (2006.01)
*G02B 6/12* (2006.01)
(52) U.S. Cl. ........... 385/14; 385/131; 345/175; 345/176
(58) Field of Classification Search .......... 345/173–176; 385/12–14, 129–132
See application file for complete search history.

(56) References Cited

U.S. PATENT DOCUMENTS 7,738,746 B2 * 6/2010 Charters et al. ................. 385/13
2004/0140961 A1 * 7/2004 Cok .............................. 345/175

FOREIGN PATENT DOCUMENTS

| JP | 4-0003842 B2 | 1/1992 |
| JP | 9-0003311 A | 1/1997 |
| JP | 11-086698 A | 3/1999 |

* cited by examiner

*Primary Examiner* — Daniel Petkovsek
(74) *Attorney, Agent, or Firm* — Westerman, Hattori, Daniels & Adrian, LLP

(57) ABSTRACT

An optical touch panel 10 includes: a coordinate input region 11; a light-emitting element 12 which emits light in a near-infrared region; a light-receiving element 13 which receives light in visible and near-infrared regions; a light-emitting sided-optical waveguide 14 connected to the light-emitting element 12 and having an output end; and a light-receiving sided-optical waveguide 15 connected to the light-receiving element 13 and having an input end. The output end 14a of the light-emitting sided-optical waveguide 14 and the input end 15a of the light-receiving sided-optical waveguide 15 are located on opposite sides of the coordinate input region. The light-receiving sided-optical waveguide 15 has an organic colored layer 16 provided on at least part of a surface thereof. The organic colored layer 16 has a lower light transmittance in a visible light region than in a near-infrared region.

2 Claims, 3 Drawing Sheets

OPTICAL TOUCH PANEL

BACKGROUND OF THE INVENTION

1. Field of the Invention

The present invention relates to an optical touch panel.

2. Description of the Related Art

Optical touch panels are widely used in, for example, bank ATM systems and railway ticket-vending machines because their reliability is high and their coordinate input region has a high transmittance and therefore can display sharp images. However, a conventional optical touch panel has a problem in that it cannot detect touches in environments where ambient light such as sunlight and light from lamps is strong because input to its light-receiving element becomes excessive.

In order to solve such a problem, there has been proposed an optical touch panel in which a light blocking member for preventing the entry of ambient light is provided above a light-emitting element line and a light-receiving element line arranged around a coordinate input region (see Japanese Unexamined Patent Publication No. 11-86698). However, the blockage of ambient light by the light blocking member is not yet sufficient, and therefore it remains difficult to use such an optical touch panel in environments with higher light levels such as outdoors.

SUMMARY OF THE INVENTION

As described above, a conventional optical touch panel cannot detect touches in environments where ambient light such as sunlight and light from lamps is strong due to excessive input to its light-receiving element. It is therefore an object of the present invention to provide an optical touch panel which can be used even in environments with high ambient light levels.

The optical touch panel according to the present invention has an organic colored layer provided on at least part of the surface of a light-receiving sided-optical waveguide which is likely to directly receive ambient light. The organic colored layer has a high optical transmittance at the wavelength of light emitted from a light-emitting element (in the near-infrared region around 850 nm), but has a low optical transmittance in the visible region (wavelengths: 380 to 780 nm). Therefore, even when the optical touch panel according to the present invention is used in environments with high levels of visible ambient light (wavelengths: 380 to 780 nm), input to its light-receiving element is less likely to become excessive. For this reason, the optical touch panel according to the present invention can be used in environments with high levels of visible ambient light.

The gist of the present invention is as follows:

In a first preferred embodiment, an optical touch panel according to the present invention comprises: a coordinate input region; a light-emitting element which emits light in a near-infrared region; a light-receiving element which receives light in visible and near-infrared regions; a light-emitting-sided-optical waveguide connected to the light-emitting element and having an output end; and a light-receiving sided-optical waveguide connected to the light-receiving element and having an input end, wherein the output end of the light-emitting sided-optical waveguide and the input end of the light-receiving sided-optical waveguide are located on opposite sides of the coordinate input region; the light-receiving sided-optical waveguide has an organic colored layer provided on at least part of a surface thereof; and the organic colored layer has a lower light transmittance in a visible light region than in a near-infrared region.

In a second preferred embodiment of the optical touch panel according to the present invention, the organic colored layer has a visible light transmittance of 20% or lower at a wavelength of 600 nm and a near-infrared transmittance of 80% or higher at a wavelength of 850 nm.

ADVANTAGE OF THE INVENTION

As described above, the optical touch panel of the present invention has an organic colored layer provided on the surface of the light-receiving sided-optical waveguide to block visible ambient light, and therefore can be used even in environments with high ambient light levels (e.g., 10,000 lux).

For a full understanding of the present invention, reference should now be made to the following detailed description of the preferred embodiments of the invention as illustrated in the accompanying drawings.

DESCRIPTION OF THE PREFERRED EMBODIMENTS

Figure 1:
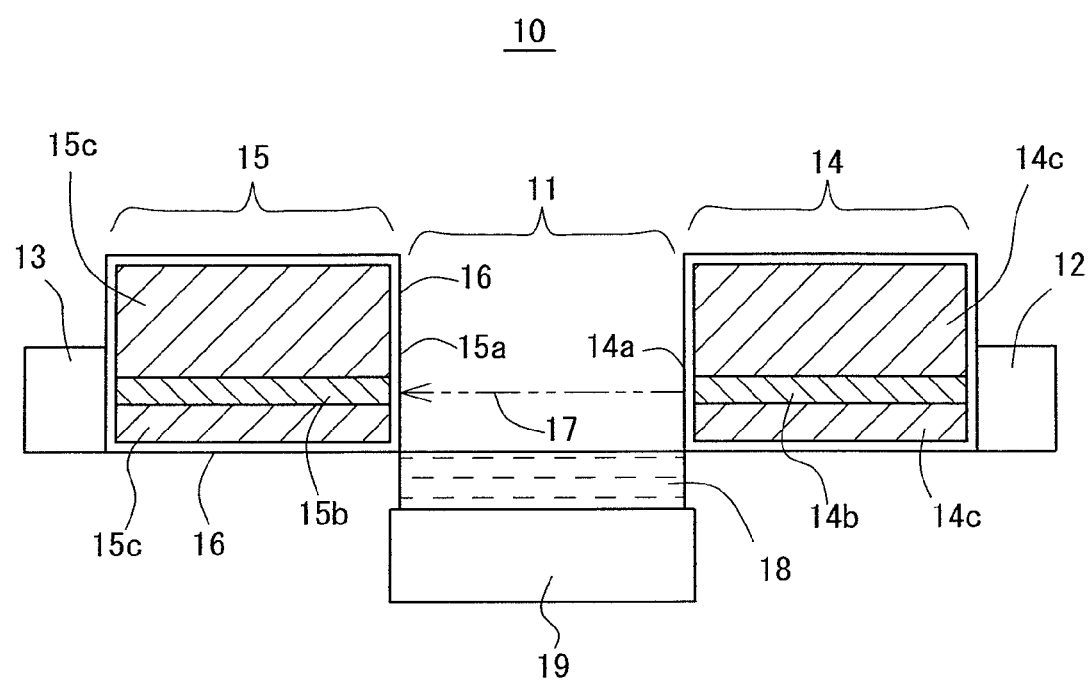
FIG. 1 is a schematic sectional view of an optical touch panel according to the present invention.

The preferred embodiments of the present invention will now be described with reference to FIGS. 1-4 of the drawings. Identical elements in the various figures are designated with the same reference numerals.

<Optical Touch Panel>

As shown in FIG. 1 (schematic sectional view), an optical touch panel 10 of the present invention comprises: a coordinate input region 11; a light-emitting element 12 which emits light in a near-infrared region; a light-receiving element 13 which receives light in visible and near-infrared regions; a light-emitting sided-optical waveguide 14 connected to the light-emitting element 12; and a light-receiving sided-optical waveguide 15 connected to the light-receiving element 13. The light-emitting sided-optical waveguide 14 has an output end 14$a$, and the light-receiving sided-optical waveguide 15 has an input end 15$a$. The output end 14$a$ and the input end 15$a$ are located on opposite sides of the coordinate input region 11. The light-receiving sided-optical waveguide 15 has an organic colored layer 16 provided on at least part of the surface thereof. The organic colored layer 16 has a low visible light transmittance and a high near-infrared transmittance. The organic colored layer 16 preferably covers at least part of the surface of the light-receiving sided-optical waveguide 15 which directly receives ambient light.

In the optical touch panel 10 of the present invention, light 17 travels through the light-receiving sided-optical waveguide 15 to the light-receiving element 13. This makes it possible to significantly reduce the number of the light-receiving elements 13 and increase the flexibility of the installation position of the light-receiving element 13. Therefore, the adverse effect of ambient light can be significantly reduced simply by providing the light-receiving sided-optical waveguide 15. However, by further providing the organic colored layer 16 on the surface of the light-receiving sided-optical waveguide 15, it is also possible to prevent ambient light from traveling through the light-receiving sided-optical waveguide 15 to the light-receiving element 13. This makes it possible to use the optical touch panel 10 even in environments with higher ambient light levels.

In the optical touch panel 10 of the present invention, light emitted from the light-emitting element 12 passes through a plurality of light-emitting sided-cores 14b, exits from the light-emitting sided-cores 14b through the distal end portions thereof, crosses the coordinate input region 11, enters a plurality of light-receiving sided-cores 15b through the distal end portions thereof, passes through the light-receiving sided-cores 15b, and reaches the light-receiving element 13. When part of the light 17 crossing the coordinate input region 11 is blocked by a finger or a pen, the intensity of the light received by the light-receiving element 13 is reduced. By detecting such a reduction in light intensity, it is possible to determine the coordinates of the position of the finger or pen.

Figure 2:
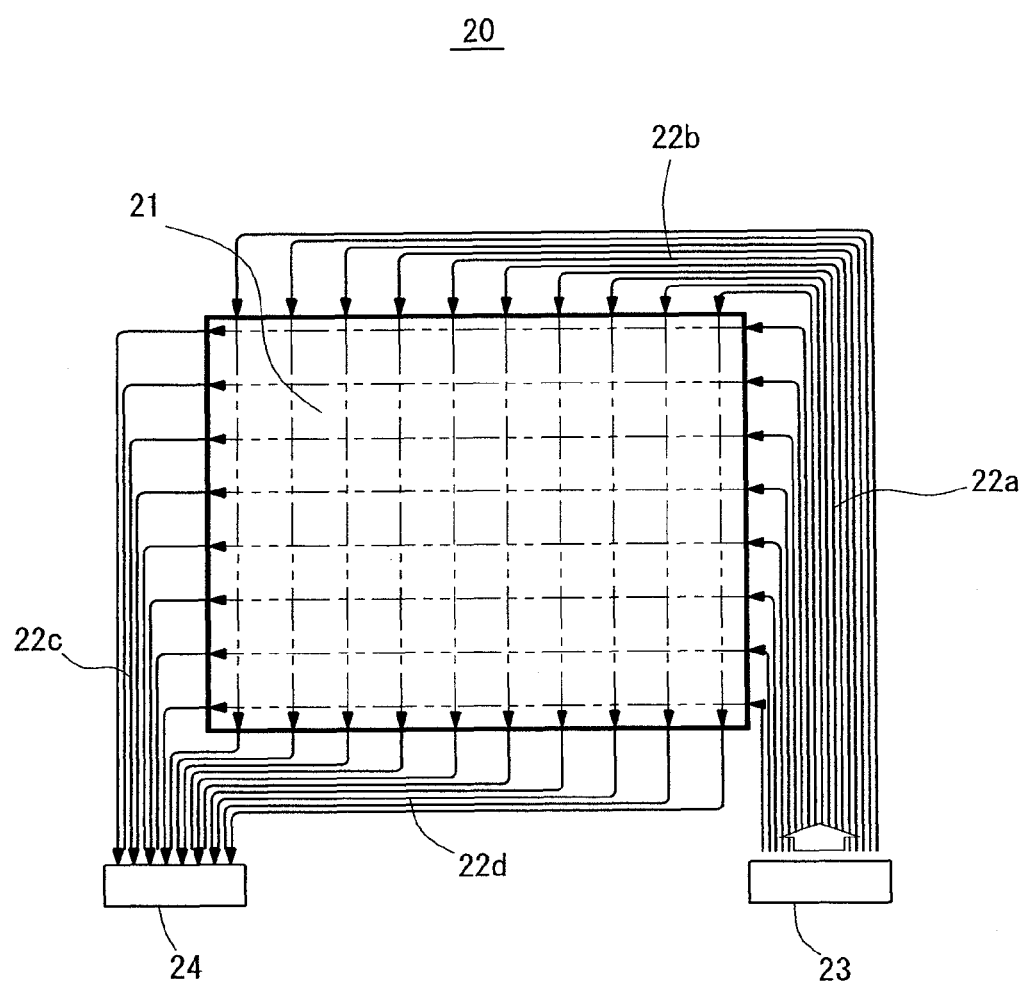
FIG. 2 is a schematic plan view of the optical touch panel according to the present invention.

As shown in FIG. 2 (schematic plan view), an optical touch panel 20 according to a preferred embodiment of the present invention has optical waveguides 22a, 22b, 22c, and 22d provided around a rectangular coordinate input region 21. More specifically, the optical waveguides 22a and 22b provided along two adjacent sides of the coordinate input region 21 are connected to a light-emitting element 23 at their proximal ends, and the optical waveguides 22c and 22d provided along the other two adjacent sides of the coordinate input region 21 are connected to a light-receiving element 24 at their proximal ends. Such a structure allows the optical touch panel 20 to detect two-dimensional coordinates. Unlike conventional touch panels, the optical touch panel of the present invention does not need to have a plurality of light-emitting diodes (LEDs) and a plurality of phototransistors to be arranged around the coordinate input region. This makes it possible to reduce the thickness and weight of the optical touch panel of the present invention.

<Coordinate Input Region>

In this specification, the word "coordinate input region" refers to a region for performing coordinate input by a finger or a pen. The coordinate input region is typified by, for example, an image display unit, such as a liquid crystal panel, a plasma display panel, or an organic EL panel and the like. Basically, the coordinate input region of the optical touch panel of the present invention does not need to have an overlay (e.g., an ITO film layer, a film layer, or a glass layer) functioning as a sensor because an optical waveguide, a light-emitting element, and a light-receiving element to be provided in an area surrounding the coordinate input region function as sensors for determining coordinates. The overlay has the drawback of making images displayed on a coordinate input region such as a liquid crystal panel relatively dark and unsharp. However, as described above, since the optical touch panel of the present invention does not need to have an overlay, images displayed on its coordinate input region are not degraded.

As shown in FIG. 1, the optical touch panel 10 of the present invention preferably includes a transparent panel 18 for preventing the uppermost surface of the coordinate input region 11 from being scratched or stained. The transparent panel 18 is not particularly limited, and any panel, such as a glass plate or an acrylic plate and the like can be used. The thickness of the transparent panel 18 is preferably 10 μm to 5 mm. Although an image display unit 19 such as a liquid crystal panel, a plasma display panel, or an organic EL panel is provided just below the transparent panel 18, images displayed on the image display unit 19 are hardly degraded by the transparent panel 18.

<Light-Emitting Element•Light-Receiving Element>

The light-emitting element to be used in the present invention is an element that emits light in the near-infrared region, and is preferably a light-emitting diode or a semiconductor laser, more preferably a VCSEL (Vertical Cavity Surface Emitting Laser). A VCSEL is excellent in light transmission because light in a VCSEL is resonated in a direction perpendicular to a substrate surface and light emitted therefrom also propagates in a direction perpendicular to the substrate surface. The wavelength of light emitted from the light-emitting element is within the near-infrared region (700 nm to 2500 nm).

The light-receiving element to be used in the present invention receives light in the visible and near-infrared regions and converts an optical signal to an electrical signal. The light-receiving element is preferably a CMOS (Complementary Metal Oxide Semiconductor) image sensor or a CCD (Charge Coupled Device) image sensor.

<Light-Emitting Sided-Optical Waveguide•Light-Receiving Sided-Optical Waveguide>

As shown in FIG. 1, the light-emitting sided-optical waveguide 14 to be used in the optical touch panel 10 of the present invention has a light-emitting sided-cladding layer 14c and a plurality of light-emitting sided-cores 14b buried in the light-emitting sided-cladding layer 14c. The light-receiving sided-optical waveguide 15 has a light-receiving sided-cladding layer 15c and a plurality of light-receiving sided-cores 15b buried in the light-receiving sided-cladding layer 15c.

The light-emitting sided-cores 14b are made of a material having a higher refractive index than the light-emitting sided-cladding layer 14c, and the material is highly transparent at the wavelength of light traveling through the light-emitting sided-cores 14b. The light-receiving sided-cores 15b are made of a material having a higher refractive index than the light-receiving sided-cladding layer 15c, and the material is highly transparent at the wavelength of light traveling through the light-receiving sided-cores 15b. The light-emitting sided-cores 14b and the light-receiving sided-cores 15b are preferably made of a UV curable resin having excellent patterning properties. Preferred examples of such a UV curable resin include UV curable acrylic resins, UV curable epoxy resins, UV curable siloxane resins, UV curable norbornene resins, and UV curable polyimide resins.

The refractive index of the light-emitting sided-cladding layer 14c is lower than that of the light-emitting sided-core 14b, and the refractive index of the light-receiving sided-cladding layer 15c is lower than that of the light-receiving sided-core 15b. The difference in refractive index between the light-emitting sided-core 14b and the light-emitting sided-cladding layer 14c and between the light-receiving sided-core 15b and the light-receiving sided-cladding layer 15c is preferably 0.01 or more, more preferably 0.02 to 0.2.

The refractive index of a resin for forming the light-emitting sided-cores 14b and the light-receiving sided-cores 15b or the light-emitting sided-cladding layer 14c and the light-receiving sided-cladding layer 15c can be increased or decreased by introducing an organic group appropriately selected into the resin or changing the organic group content of the resin. For example, the refractive index of the resin can be increased by, for example, introducing a cyclic aromatic group (e.g., a phenyl group) into a resin molecule or increasing a cyclic aromatic group content per resin molecule. On the other hand, the refractive index of the resin can be decreased by, for example, introducing a linear or cyclic aliphatic group (e.g., a methyl group or a norbornene group) into a resin molecule or increasing a linear or cyclic aliphatic group content per resin molecule.

The cross-sectional shape of each of the light-emitting sided-cores 14b and the light-receiving sided-cores 15b is not particularly limited, but is preferably trapezoidal or rectangular from the viewpoint of patterning properties. The width of the lower base of the cross section of each of the cores is preferably 10 to 500 μm. The height of the cross section of each of the cores, which is defined as the length between the midpoint of the upper base and the midpoint of the lower base of the cross section of each of the cores, is preferably 10 to 100 μm. The light-emitting sided-optical waveguide 14 and the light-receiving sided-optical waveguide 15 can be formed by any method such as a dry etching method using plasma, a transfer method, an exposure and development method, or a photobleaching method.

<Organic Colored Layer>

The organic colored layer 16 to be used in the optical touch panel 10 of the present invention has a low visible light transmittance and a high near-infrared transmittance. The visible light transmittance at 600 nm of the organic colored layer 16 is preferably 20% or lower, more preferably 10% or lower. The near-infrared transmittance at 850 nm of the organic colored layer 16 is preferably 80% or higher, more preferably 90% or higher.

The organic colored layer 16 preferably contains one or more organic pigments, and may further contain, for example, a resin binder and/or a UV absorber. It is preferred that the organic pigment has high light absorptivity in the wide visible region but has low or no light absorptivity in the near-infrared region. Examples of such an organic pigment include black pigments such as C.I. Solvent Black 27, C.I. Solvent Black 28, and C.I. Solvent Black 2G, anthraquinone-based pigments mentioned in Japanese Examined Patent Publication No. 4-3842, mixtures each containing a green pigment and a red pigment mentioned in Japanese Unexamined Patent Publication No. 9-3311.

The thickness of the organic colored layer 16 is preferably 5 to 50 μm, more preferably 10 to 40 μm. Such a thickness within the above range of the organic colored layer 16 is sufficient to impart good optical properties to an optical touch panel using an optical waveguide, and therefore the weight and thickness of the optical touch panel can be reduced. Examples of a method for forming the organic colored layer on at least part of the surface of the light-receiving sided-optical waveguide include a dipping method in which an optical waveguide is dipped into and pulled out of an organic pigment solution to form a film on the optical waveguide, a spraying method in which an organic pigment solution is sprayed onto an optical waveguide, and a casting method in which an organic pigment solution is applied onto an optical waveguide using a coater. It is to be noted that in the present invention, the organic colored layer may be formed not only on the surface of the light-receiving sided-optical waveguide but also on at least part of the surface of the light-emitting sided-optical waveguide by any one of the above-described methods.

<Method for Producing Optical Touch Panel>

Figure 3:
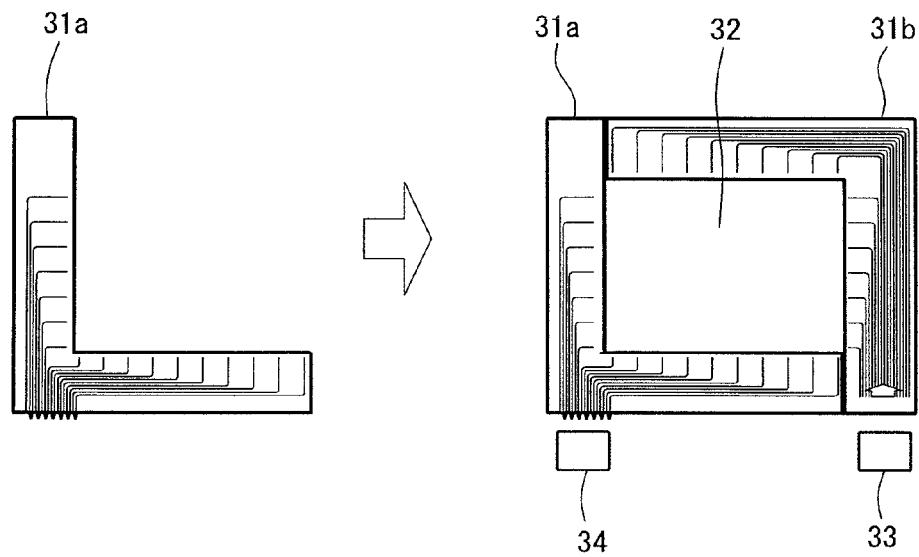
FIG. 3 is a diagram for explaining a method for producing an optical touch panel according to the present invention.

An optical touch panel 30 of the present invention can be produced by, for example, the following method. As shown in FIG. 3, two L-shaped optical waveguides 31a and 31b are first formed by any one of the above-described methods, and then these two L-shaped optical waveguides 31a and 31b are arranged so that the output end of the L-shaped optical waveguide 31b and the input end of the L-shaped optical waveguide 31a are located on the opposite sides of a coordinate input region 32. Then, one of the optical waveguides, that is, the optical waveguide 31b is connected to a light-emitting element 33 at the proximal ends of its cores, and the other optical waveguide, that is, the optical waveguide 31a is connected to a light-receiving element 34 at the proximal ends of its cores. According to such a method, by forming optical waveguides by, for example, an exposure and development method using a photo mask, it is possible to produce an optical touch panel having a large area even when the area of the photo mask is relatively small.

A method for producing the optical touch panel of the present invention is not limited to the above-described method in which L-shaped optical waveguides are assembled. For example, the optical touch panel of the present invention may be produced by assembling four I-shaped optical waveguides or using a frame-shaped optical waveguide requiring no assembly.

<Applications>

Examples of the application of the optical touch panel of the present invention include, but are not limited to, operation panels of public input systems such as ticket-vending machines and bank ATM systems, portable devices, such as mobile phones and portable game devices, office equipment such as copiers, car navigation systems, POS systems, and industrial machines.

EXAMPLES

Example 1

Preparation of Varnish for Forming Cladding Layer

A varnish for forming cladding layer was prepared by mixing 100 parts by weight of a UV-curable epoxy-based resin having an alicyclic skeleton (EP 4080E manufactured by ADEKA CORPORATION) (Component A) and 2 parts by weight of a photo-acid-generation agent (CPI-200K manufactured by SAN-APRO Ltd.) (Component B).

<Preparation of Varnish for Forming Cores>

A varnish for forming cores was prepared by mixing 40 parts by weight of a UV-curable epoxy-based resin having a fluorene skeleton (OGSOL EG manufactured by Osaka Gas Chemicals Co., Ltd.) (Component C), 30 parts by weight of a UV-curable epoxy-based resin having a fluorene skeleton (EX-1040 manufactured by Nagase ChemteX Corporation) (Component D), 30 parts by weight of 1,3,3-tris(4-(2-(3-oxetanyl)butoxyphenyl)butane (its production method will be described later) (Component E), 1 part by weight of the Component B, and 41 parts by weight of ethyl lactate.

<Method for Producing 1,3,3-tris(4-(2-(3-oxetanyl)butoxyphenyl)butane>

A 200 ml three-necked flask having a thermometer, a condenser, and a stirrer was prepared. Then, 6.68 g (20 mmol) of 1,3,3-tris(4-hydroxyphenyl)butane and 25 ml of N-methyl-2-pyrrolidone were placed in the three-necked flask and stirred while being heated at 80° C. in an atmosphere of nitrogen until 1,3,3-tris(4-hydroxyphenyl)butane was completely dissolved in N-methyl-2-pyrrolidone. After complete dissolution, 23.46 g (72 mmol) of cesium carbonate was added thereto, and the resulting mixture was further stirred for 30 minutes. Then, 17.84 g (66 mmol) of 2-(3-oxetanyl)butyltosylate previously synthesized was added thereto, and the resulting mixture was stirred for 20 hours at 80° C. in an atmosphere of nitrogen. After the completion of reaction, the mixture was cooled to room temperature, and 100 ml of ethyl acetate and 50 ml of distilled water were added to the mixture. The resulting mixture was left standing to separate into an aqueous phase and an organic phase. The thus obtained organic phase was extracted, washed with water, and dried with anhydrous magnesium sulfate overnight. Then, magnesium sulfate was removed by filtration, and the solvent was distilled away to obtain a crude reaction product. The crude reaction product was separated and purified by silica-gel column chromatography (eluent: n-hexane/acetone) to obtain 12.20 g of a clear and colorless semisolid substance (yield: 97%). The thus obtained compound was analyzed by $^1$H-NMR and $^{13}$C-NMR spectrometers (both manufactured by JEOL Ltd.) and found to be 1,3,3-tris(4-(2-(3-oxetanyl)butoxypheny)butane.

<Formation of Optical Waveguide>

The varnish for forming cladding layer was applied onto the surface of a polyethylene naphthalate film having a thickness of 188 μm, irradiated with UV light at 1000 mJ/cm$^2$, and thermally-treated at 80° C. for 5 minutes to form an under-cladding layer having a thickness of 20 μm. The refractive index of the under-cladding layer as measured at a wavelength of 830 nm was 1.510.

Then, the varnish for forming cores was applied onto the surface of the under-cladding layer and thermally-treated at 100° C. for 5 minutes to form a core layer. The core layer was then covered with a photo mask (gap: 100 μm), irradiated with UV light (measurement wavelength: 365 nm) at 2500 mJ/cm$^2$, and thermally-treated at 100° C. for 10 minutes. Patterning of the core layer was performed by dissolving away an unexposed portion of the core layer using an aqueous γ-butyrolactone solution and thermally treating the core layer at 120° C. for 5 minutes so that an L-shaped optical waveguide shown in FIG. 3 having cores each having a width of 20 μm and a height of 50 μm was obtained. The refractive index of each of the cores as measured at a wavelength of 830 nm was 1.592.

Figure 4:
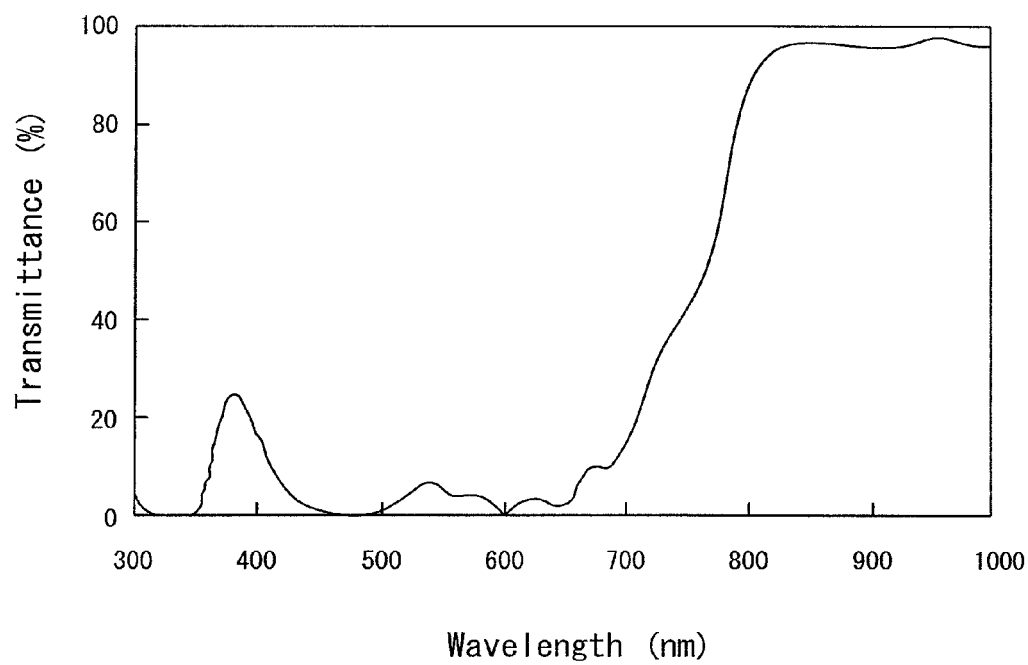
FIG. 4 is a graph showing a light transmission spectrum of an organic colored layer.

Then, the thus formed optical waveguide was dipped into a solution containing an organic pigment (FS-Black 1927 manufactured by Arimoto Chemical Co., Ltd.) for 1 minute at room temperature, and was then dried at 80° C. for 30 minutes so that an organic colored layer having a thickness of 10 μm was formed on the surface of the optical waveguide. The light transmission spectrum of the organic colored layer is shown in FIG. 4. As can be seen from FIG. 4, the organic colored layer had a visible light transmittance of 0.9% at a wavelength of 600 nm and a near-infrared transmittance of 95.6% at a wavelength of 850 nm.

Comparative Example

An optical waveguide was formed in the same manner as in the Example 1 except that the optical waveguide was not dipped into the organic pigment-containing solution and therefore no organic colored layer was formed on the surface of the optical waveguide.

<Evaluation>

As shown in FIG. 3, two optical waveguides of the Example 1 were prepared as the optical waveguides 31a and 31b. The light-emitting element 33 (VCSEL manufactured by Optwell) emitting light having a wavelength of 850 nm was connected to one end of the optical waveguide 31b. On the other hand, the light-receiving element 34 (CMOS linear sensor array manufactured by TAOS Inc.) was connected to one end of the optical waveguide 31a. The optical waveguides 31a and 31b were arranged so that the output end of the optical waveguide 31b and the input end of the optical waveguide 31a are located on the opposite sides of the coordinate input region 32. In this way, the optical touch panel 30 shown in FIG. 3 having a diagonal size of 3 inches was produced. An optical touch panel using optical waveguides of the Comparative Example was also produced in the same manner as described above.

The optical touch panel of the Example and the optical touch panel of the Comparative Example were placed in a darkroom, and light having an intensity of 5000 μW was emitted from the light-emitting element of each of the optical touch panels. As a result, the intensity of the light received by the light-receiving element of each of the optical touch panels was 5 μW. Then, each of the optical touch panels was placed in different environments with ambient light, and the intensity of ambient light received by the light-receiving element was measured without allowing the light-emitting element to emit light. The measurement results are shown in Table 1.

TABLE 1

Intensities of Ambient Light Received by Light-Receiving Element Measured in Different Environments

| | Measurement Environments Illuminance (lux) | | |
|---|---|---|---|
| | Dark room 1 | Indoors, near window 5,400 | Outdoors, in shade 19,000 |
| Example 1 (μW) | 0 | 0.2 | 1.2 |
| Comparative Example (μW) | 0 | 1.4 | 4.6 |

When the optical touch panel of the Example 1 having the organic colored layer was placed outdoors in the shade, the intensity of ambient light received by the light-receiving element was 1.2 μW which was sufficiently smaller than the intensity of light received by the light-receiving element when the light-emitting element emitted light in the darkroom (i.e., 5 μW). Therefore, the optical touch panel of the Example can be used even when placed outdoors in the shade. On the other hand, when the optical touch panel of the Comparative Example having no organic colored layer was placed outdoors in the shade, the intensity of ambient light received by the light-receiving element was 4.6 μW which was close to the intensity of light received by the light-receiving element when the light-emitting element emitted light in the darkroom (i.e., 5 μW). Therefore, the optical touch panel of the Comparative Example cannot be used outdoors in the shade because there is a strong possibility that it will malfunction in such an environment.

<Measurement Methods>
<Refractive Index>

The varnish for forming cladding layer was applied onto a silicon wafer by spin coating to form a film of the varnish, and the silicon wafer was used as a sample for measuring the refractive index of a cladding layer. The varnish for forming cores was applied onto another silicon wafer by spin coating to form a film of the varnish, and the silicon wafer was used as a sample for measuring the refractive index of a core. Measurement of refractive index was performed using a prism coupler (SPA-400 manufactured by Sairon Technology, Inc.).

<Width and Height of Core>

An optical waveguide was cut crosswise using a dicing saw (DAD525 manufactured by DISCO Corporation), and the cutting surface of the optical waveguide was observed using a laser microscope (manufactured by Keyence Corporation) to measure the width and height of each core.

<Transmittance>

An organic colored layer having a thickness of 10 μm was formed on a glass plate, and the transmission spectrum of the organic colored layer was measured using a spectrophotometer (U-4100 manufactured by Hitachi Ltd.). It is to be noted that the transmission spectrum of the glass plate was also measured as a reference before the organic colored layer was formed thereon.

This application claims priority from Japanese Patent Application No. 2008-202660, which is incorporated herein by reference.

There have thus been shown and described a novel optical touch panel which fulfills all the objects and advantages sought therefor. Many changes, modifications, variations and other uses and applications of the subject invention will, however, become apparent to those skilled in the art after considering this specification and the accompanying drawings which disclose the preferred embodiments thereof. All such changes, modifications, variations and other uses and applications which do not depart from the spirit and scope of the invention are deemed to be covered by the invention, which is to be limited only by the claims which follow.

What is claimed is:

1. An optical touch panel comprising:
   a coordinate input region;
   a light-emitting element which emits light in a near-infrared region;
   a light-receiving element which receives light in visible and near-infrared regions;
   a light-emitting sided-optical waveguide connected to the light-emitting element and having an output end; and
   a light-receiving sided-optical waveguide connected to the light-receiving element and having an input end, wherein
   the output end of the light-emitting sided-optical waveguide and the input end of the light-receiving sided-optical waveguide are located on opposite sides of the coordinate input region; the light-receiving sided-optical waveguide has an organic colored layer provided on at least part of a surface thereof; and the organic colored layer has a lower light transmittance in a visible light region than in a near-infrared region.

2. The optical touch panel according to claim 1, wherein the organic colored layer has a visible light transmittance of 20% or lower at a wavelength of 600 nm and a near-infrared transmittance of 80% or higher at a wavelength of 850 nm.

* * * * *